July 9, 1929.  W. H. SANFORD  1,720,610
LIQUID DISPENSER
Filed May 20, 1927
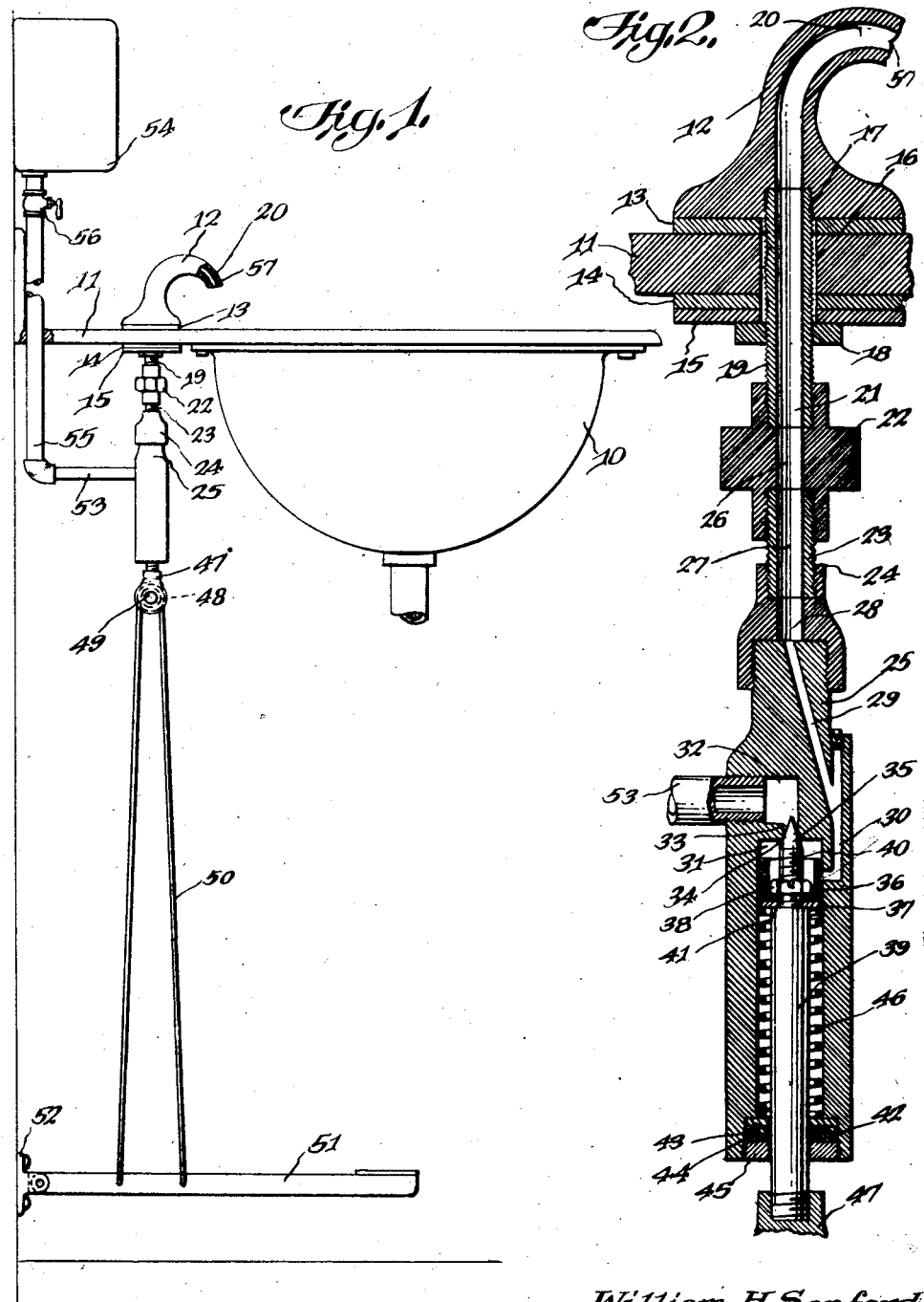
William H. Sanford
INVENTOR
BY Victor J. Evans
ATTORNEY Patented July 9, 1929.

1,720,610

UNITED STATES PATENT OFFICE.

WILLIAM H. SANFORD, OF CHICAGO, ILLINOIS.

LIQUID DISPENSER.

Application filed May 20, 1927. Serial No. 193,001.

This invention relates to certain novel improvements in liquid dispensers and more particularly to a dispenser adapted to be used in connection with a wash basin to supply liquid soap.

The salient object of my invention is to provide a liquid dispenser which shall be foot operated.

A further object of the invention is to provide a liquid dispenser of the type mentioned which will function without the usual pump action.

Other objects will appear hereinafter.

The invention consists in the novel combination and arrangement of parts to be hereinafter described and claimed.

The invention will be best understood by reference to the accompanying drawings, showing the preferred form of construction and in which:

Fig. 1 is an elevational view showing my invention associated with a wash basin; and Fig. 2 is a longitudinal sectional view showing a portion of my invention.

In the preferred embodiment of my invention as illustrated in the accompanying drawings, I provide a wash basin 10 which may be of any desired style or type. In the present instance the wash basin 10 has a projection 11 which may be either a lip on the basin or it may be the bracket for supporting said basin. In the present instance the nozzle 12 of my improved dispenser is adapted to be mounted on this lip 11.

A gasket 13 is disposed between the lip 11 and the nozzle 12 and a gasket 14 is provided on the other side of the lip 11 and a washer 15 is in engagement therewith. An opening 16 is provided in the lip 11 which extends therethrough and in alignment with the opening 16 are openings in the gaskets 13 and 14 and the washer 15.

In alignment with the opening 16 a recess 17 is provided in the nozzle 12 and screw threads are provided in this recess. A nut 18 has screw threaded engagement with a projection 19 which extends through the openings in the washer 15 and the gaskets 14 and 13 and the openings 16, and which has screw threaded engagement with the screw threads in the recess 16 and secures the nozzle 12 in position on the projection 11.

A passage 20 is provided in the nozzle 12 and a passage 21 is provided in the projection 19 said passages being in communication. A coupling 22 engages the screw threads on the projection 19 and has screw threaded engagement with a connector 23. The other end of the connecting member 23 has screw threaded engagement with the coupling 24 which in turn has screw threaded engagement with the valve housing 25. A passage 26 is provided in the coupling 22 and a passage 27 is provided in the connector 23 and a passage 28 is provided in the coupling 24, said passages being in communication with each other and with the passages 20 and 21 so as to establish communication between the valve housing 25 and the nozzle 12.

A reduced passage 29 is provided in the valve housing 25 and establishes communication between the passage 28 and a passage 30 which is also contained in the valve housing 25. The passage 30 has communication with an elongated chamber 31 in which the valve operating mechanism is contained. An inlet chamber 32 is provided in the valve housing 25 and a restricted passage 33 establishes communication between the chambers 31 and 32 and provides a valve seat 34 surrounding the restricted passage. Engaging the valve seat 34 is a needle valve 35 which is removably secured to the cup-shaped guide 36 that is slidably mounted in the chamber 31. The needle valve 35 is carried on the inner end of the valve operating rod 39 and is located on a reduced portion 40 of said rod 39. The periphery of the reduced portion 40 is screw threaded and extends through an opening provided in the guide member 36. It is apparent that a shoulder 41 will be provided on the valve operating rod 39 at the point where the reduced portion 40 thereof is attached. Disposed between this shoulder 41 and the guide member 36 is a washer 37, and a nut 38 which engages the screw threads on the projection 40 is provided within the guide member 36 and locks the guide member 36 in position on the valve operating rod 39. An enlarged portion 42 of the chamber 31 is provided at the outer end thereof in the valve housing 25. A washer 43 is provided in the chamber 42 and a packing 44 is disposed between the washer 43 and the nut 45 which has screw threaded engagement with screw threads provided in the chamber 42. A spring 46 is provided around the valve operating rod 39 and extends between the washers 37 and 43 and forces the needle valve 35 into engagement with the valve seat 34 so as to prevent passage through the restricted passage 33. The guide member 36 serves a double purpose for, in addition to the just described function, it closes the entrance to the outlet passage 30 when the needle valve 35 is engaging seat 34, and when said valve is opened said guide is retracted from the entrance to said passage. The valve operating rod 39 protrudes through the washer 43, packing 44, and nut 45 and has engagement with the member 47. The member 47 is U-shaped and a roller 48 is mounted therein on the shaft 49. A cable 50 is directed around the roller 48 and the ends thereof are secured to the treddle 51 which is pivotally attached to the bracket 52 which is mounted on the wall to which the basin 10 is secured. It is apparent that by pressing downwardly on the treddle 51, the cable 50 will act to retract the valve operating rod 39 and will compress the spring 46, this action removing the needle valve 35 from engagement with the valve seat 34 and permitting passage through the restricted passage 31.

Adapted to be screw threaded into the chamber 32 is the conduit 53. Mounted at a point above the basin 10 is the container 54 and connecting the container 54 with the conduit 53 is the conduit 55. A hand operated valve 56 is provided in the conduit 55 and controls the passage therethrough.

The container 54 is mounted at a point above the basin 10 that is high enough to produce a hydraulic head sufficient to force the liquid, which in the present instance may be liquid soap, through the conduits 55, and 53, chamber 32, restricted passage 33, chamber 31, and passages 30, 29, 28, 27, 26, 21, and 20 out through the outlet 57 of the nozzle 12 when the needle valve 35 is disengaged from the valve seat 34 and the member 36 is retracted from the entrance to passage 30.

It is apparent that the needle valve 35 will ordinarily prevent passage in a manner described since the spring 46 will tend to hold said needle valve 35 in engagement with the valve seat 34 until the operating rod 39 is retracted by pressure upon the treddle 51.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claim.

Having thus described my invention, what I claim as new and desire to protect by Letters Patent is:

A valve structure including a body having an inlet chamber therein, said body having an elongated chamber formed therein, said body also having a restricted passage formed therein adapted to connect said chambers and having a valve seat surrounding said passage, said body having an outlet passage therein adapted to open into said elongated chamber, a needle valve in said elongated chamber having a portion adapted to engage said seat to close said restricted passage, a cup-shaped member on said needle valve having wall portions adapted to close said outlet passage when said needle valve is seated on said valve seat, spring means for holding said needle valve and said cup-shaped member in closing position, and means for moving said valve and said cup-shaped member to open position whereby to establish passage from said inlet chamber to said outlet passage through one end of said elongated passage.

In testimony whereof I affix my signature.

WILLIAM H. SANFORD.